United States Patent
Gao et al.

(10) Patent No.: US 9,066,303 B2
(45) Date of Patent: Jun. 23, 2015

(54) POWER CONTROL IN LTE-ADVANCED HETEROGENEOUS NETWORKS

(75) Inventors: Long Gao, Santa Clara, CA (US);
Joydeep Acharya, Sunnyvale, CA (US);
Sudhanshu Gaur, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 183 days.

(21) Appl. No.: 13/532,401

(22) Filed: Jun. 25, 2012

(65) Prior Publication Data
US 2013/0343291 A1   Dec. 26, 2013

(51) Int. Cl.
*H04W 52/24*   (2009.01)
*H04B 17/345*   (2015.01)

(52) U.S. Cl.
CPC ........... *H04W 52/244* (2013.01); *H04B 17/345* (2015.01)

(58) Field of Classification Search
None
See application file for complete search history.

(56) References Cited

U.S. PATENT DOCUMENTS

| | | | |
|---|---|---|---|
| 2010/0008230 A1* | 1/2010 | Khandekar et al. | 370/237 |
| 2011/0261769 A1* | 10/2011 | Ji et al. | 370/329 |
| 2012/0015659 A1* | 1/2012 | Kalyani et al. | 455/436 |
| 2012/0113843 A1 | 5/2012 | Watfa et al. | |
| 2012/0165032 A1* | 6/2012 | Park et al. | 455/452.1 |
| 2012/0258724 A1* | 10/2012 | Kim et al. | 455/452.2 |
| 2013/0107798 A1 | 5/2013 | Gao et al. | |
| 2013/0170396 A1* | 7/2013 | Dinan | 370/254 |
| 2013/0182583 A1* | 7/2013 | Siomina et al. | 370/252 |
| 2013/0182663 A1* | 7/2013 | Ji et al. | 370/329 |
| 2013/0295949 A1* | 11/2013 | Seo et al. | 455/452.1 |
| 2013/0303153 A1* | 11/2013 | Bontu et al. | 455/423 |
| 2013/0310058 A1* | 11/2013 | Ibrahim et al. | 455/452.1 |
| 2013/0343241 A1* | 12/2013 | Niu et al. | 370/280 |
| 2014/0003273 A1* | 1/2014 | Dimou et al. | 370/252 |
| 2014/0029565 A1* | 1/2014 | Kim et al. | 370/329 |
| 2014/0036737 A1* | 2/2014 | Ekpenyong et al. | 370/280 |
| 2014/0036786 A1* | 2/2014 | Kazmi et al. | 370/329 |
| 2014/0198766 A1* | 7/2014 | Siomina et al. | 370/330 |

OTHER PUBLICATIONS

EP application No. 13173477.4-1855, European Search Report dated on Aug. 19, 2014.

* cited by examiner

*Primary Examiner* — Anh-Vu Ly
(74) *Attorney, Agent, or Firm* — Procopio, Cory, Hargreaves & Savitch LLP (57) ABSTRACT

Embodiments described herein are directed to a power control scheme for Long Term Evolution Advanced (LTE-A) heterogeneous networks to reduce the interference from macro base stations (BS) to pico user equipment (UE). The embodiments described herein may be used to develop LTE-A heterogeneous networks to balance the achievable throughput between macro and pico UEs and may thereby improve the overall system performance.

15 Claims, 10 Drawing Sheets

☐ Normal transmit power   ☐ Reduced transmit power   ☐ Zero transmit power

FIG. 10

POWER CONTROL IN LTE-ADVANCED HETEROGENEOUS NETWORKS

BACKGROUND

1. Field

Embodiments of the present application are generally directed to communication networks, and more specifically, to power control schemes in heterogeneous communication networks.

2. Related Art

The Long Term Evolution-Advanced (LTE-A) network is designed to improve the spectral efficiency by reducing cell size via heterogeneous deployment of a diverse set of base stations (BS). In a heterogeneous cellular network, the macro BSs are deployed in a regular and planned manner with a high transmit power (e.g., 46 dBm), and the overlaid pico BSs are deployed in areas with poor coverage (e.g., the edge of a macro cell) with relatively low transmit power (e.g., 30 dBm). The overlaid BS deployment may improve the coverage and may provide capacity gain by increasing spatial reuse of the spectrum.

In LTE-A Release 10 (Rel-10), the macro BSs can mute certain subframes, which are known as almost blank subframes (ABS), to reduce the interference to the pico user equipment (UE). In an ABS, most resource elements (RE) are blank and only a small amount of REs carry some system information (e.g., the cell-specific reference signals and synchronization signals). The pico UEs may thereby suffer less interference and may achieve a higher data rate when the macro BSs transmit ABSs.

Figure 1:
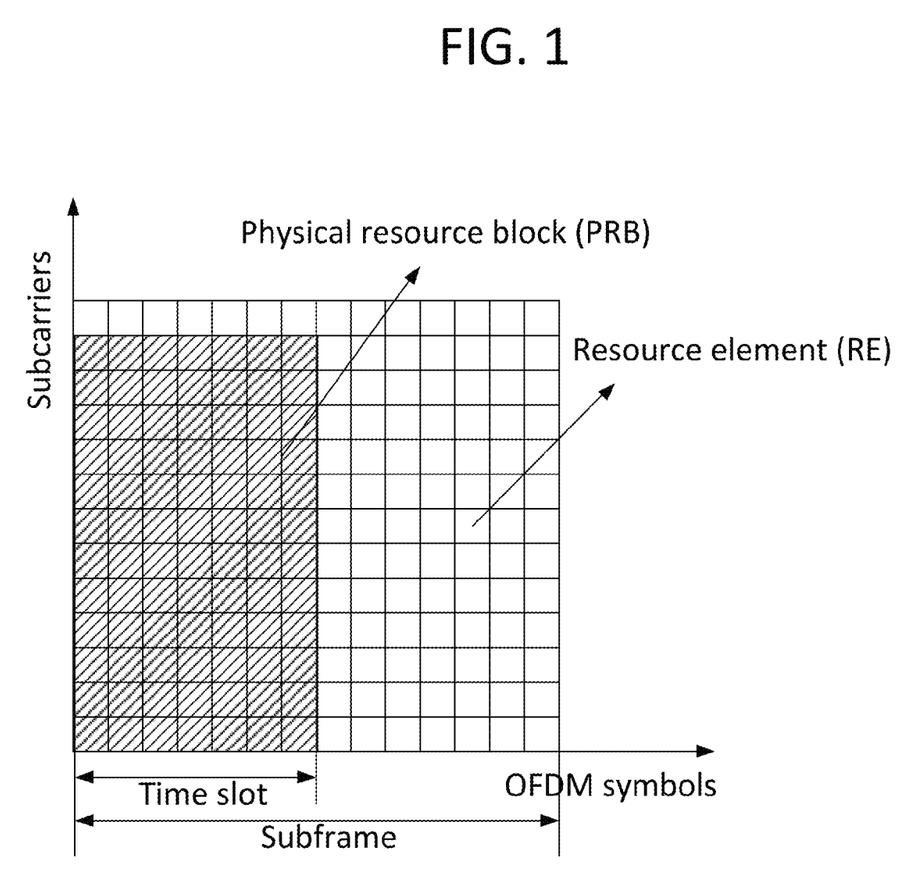
FIG. 1 illustrates an example structure of an LTE/LTE-A subframe.

In LTE-A systems, the radio resource is divided into REs and physical resource blocks (PRB). FIG. 1 illustrates an example structure of a Long Term Evolution/Long Term Evolution Advanced (LTE/LTE-A) subframe.

In FIG. 1, the structure of an LTE/LTE-A subframe is shown in time and frequency domain. Each subframe is divided into two time slots, with each time slot containing 7 orthogonal frequency-division multiplexing (OFDM) symbols (for normal cyclic prefix length). Each grid with an OFDM symbol length and a subcarrier bandwidth is called an RE. A PRB has the same length as a time slot in time domain and spans 12 subcarriers in frequency domain.

The LTE-A network is a heterogeneous network, where macro and pico BSs coexist which may improve spectral efficiency per unit area. However, in such a macro-pico deployment, the pico UEs, especially those in the cell edge, tend to suffer strong interference from their neighboring macro BSs.

SUMMARY

Aspects of the example embodiments may include a pico BS, that involves a central processing unit (CPU) configured to generate interference distribution information for UE scheduling based on at least one power allocation pattern of a plurality of PRBs associated with at least one macro BS; and schedule at least one UE associated with the pico BS based on the interference distribution information.

Additional aspects of the example embodiments may include a macro BS, that involves a CPU configured to determine a power allocation pattern for a plurality of PRBs managed by the macro BS, based on the traffic load of at least one victim pico UE; and, an interface configured to transmit the power allocation pattern to at least one pico BS associated with the at least one victim UE.

Additional aspects of the example embodiments may include a system, that involves at least one pico BS configured to generate interference distribution information for UE scheduling based on at least one power allocation pattern of a plurality of PRBs associated with at least one macro BS; and schedule at least one UE associated with the at least one pico BS based on the interference distribution information; and, the at least one macro BS configured to determine the at least one power allocation pattern for the plurality of PRBs managed by the at least one macro BS, based on the traffic load of at least one victim pico UE; and transmit the power allocation pattern to the at least one pico BS associated with the at least one victim UE.

DETAILED DESCRIPTION

In the following detailed description of example embodiments, reference will be made to the accompanying drawings, in which identical functional elements are designated with like numerals. The aforementioned accompanying drawings show by way of illustration, and not by way of limitation, example embodiments and implementations. These implementations are described in sufficient detail to enable those skilled in the art, and it is to be understood that other implementations may be utilized and that structural changes and/or substitutions of various elements may be made without departing from the scope and spirit of the example embodiments. The following detailed description is, therefore, not to be construed in a limited sense.

In an example, a power control scheme is proposed for the macro BSs to reduce their interference to pico UEs in LTE-A heterogeneous networks. In the proposed method, a pico BS chooses a set of macro BSs to report the traffic load of their victim UEs. Based on the traffic load information from one or more pico BSs, a macro BS determines its power allocation over the PRBs and shares the power allocation pattern with its neighboring pico BSs. The pico BS schedules its associated UEs for data transmission based on the received power allocation patterns from one or more macro BSs.

For the downlink of a LTE-A heterogeneous network, the pico UEs (e.g., the UEs that are associated with pico cells) suffer strong interference from its neighboring macro BSs due to the high transmit power of the macro BSs. To improve the throughput of the pico UEs, especially those on the cell edge, a power control scheme is needed for the macro BSs to control their interference to the pico UEs. Example embodiments are directed to a power control scheme to reduce the interference between macro BSs and pico UEs, which may improve the cell average and cell edge throughput of the pico UEs.

In the example embodiments, a pico BS chooses a set of macro BSs to which the pico BS reports the traffic load of the victim UEs. Based on the traffic load information from one or more pico BSs, a macro BS determines its power allocation over the physical resource blocks (PRBs) and shares the power allocation pattern with its neighboring pico BSs. The pico BS schedules its associated UEs for data transmission based on the received power allocation pattern(s) from one or more macro BSs.

Figure 2:
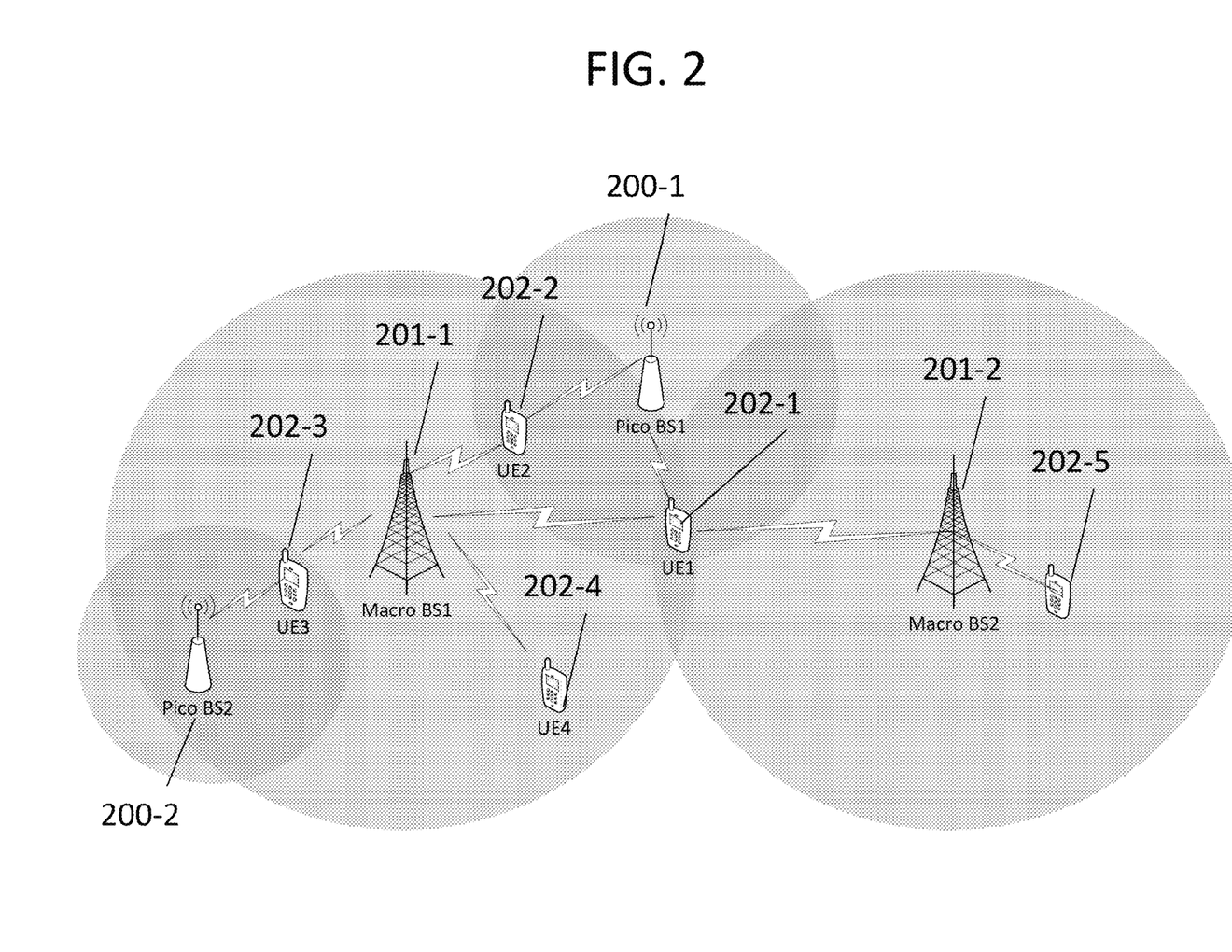
FIG. 2 illustrates a heterogeneous network, in accordance with an example embodiment.

FIG. 2 illustrates a heterogeneous network, in accordance with an example embodiment. In the example heterogeneous cellular network depicted in FIG. 2, there is a mix of pico BSs 200-1, 200-2, macro BSs 201-1, 201-2, and UEs 202-1, 202-2, 202-3, 202-4, 202-5. The macro and pico BSs work together to serve multiple UEs in an area. The UEs on the cell edge that are associated with the pico BSs may suffer strong interference from the macro BSs. For example, UE1 202-1 is associated with pico BS1 200-1, but may suffer strong interference from macro BS1 201-1 and macro BS2 201-2; UE3 202-3 is associated with pico BS2 200-2, but may suffer strong interference from macro BS1 201-1. The example embodiments can be implemented for the macro and pico BSs such that the interference from the macro BSs to the pico UEs may be reduced.

Figure 3:
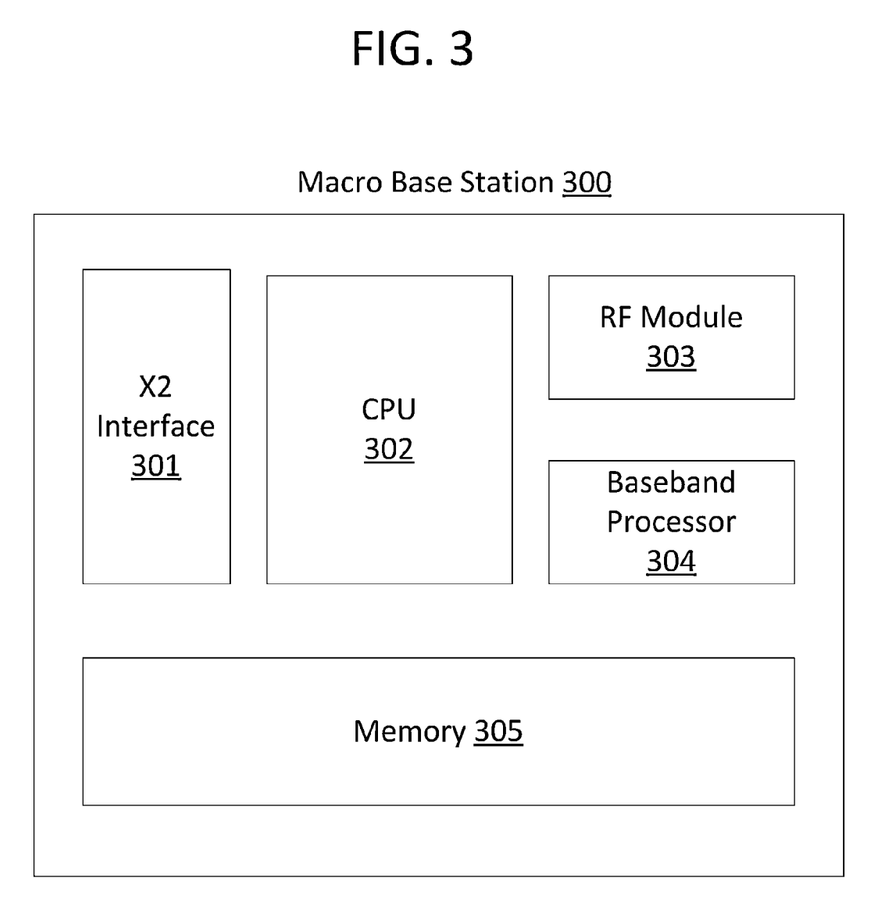
FIG. 3 illustrates a block diagram of a hardware configuration of a macro BS, in accordance with an example embodiment.

FIG. 3 illustrates a block diagram of a hardware configuration of a macro BS, in accordance with an example embodiment. The hardware configuration as depicted in the block diagram may be implemented in any macro BS (e.g., such as macro BS1 201-1 and macro BS2 201-2 as depicted in FIG. 2). The macro BS may use a configuration 300 including an X2 interface 301, a central processing unit (CPU) 302, a radio frequency (RF) module 303, a baseband processor 304 and a memory 305. The CPU 302 is configured to determine the power allocation over PRBs based on the input from the X2 interface 301 and updates the power allocation table in the memory 305. Further, the CPU 302 may also be configured to schedule the macro UEs for data transmission and to control the baseband processor 304 and RF module 303, such that the output signal of the RF module follows the selected power allocation pattern.

The baseband processor 304 is configured to handle baseband operations for the macro BS. The baseband operations may include Turbo encoding, rate matching, modulation, layer mapping, MIMO precoding, IFFT, and other operations utilized in the LTE/LTE-A standard.

The RF module 303 is configured to handle RF operations for the macro BS. The RF module converts the baseband signal fed from the baseband processor to RF signal and then transmits the RF signal through one or more antennas.

The memory 305 is configured to store the power allocation table. Further details about the contents of the power allocation table are provided below in the explanation of Table The X2 interface 301 is configured to handle information exchange with its neighboring pico BSs. Specifically, the macro BS receives the traffic load information via X2 interface from its neighboring pico BSs. Based on the received information, the macro BS determines its power allocation and informs its neighboring pico BSs of the power allocation pattern via X2 interface. The details of the above procedure are explained in the description for FIG. 8.

Figure 4:
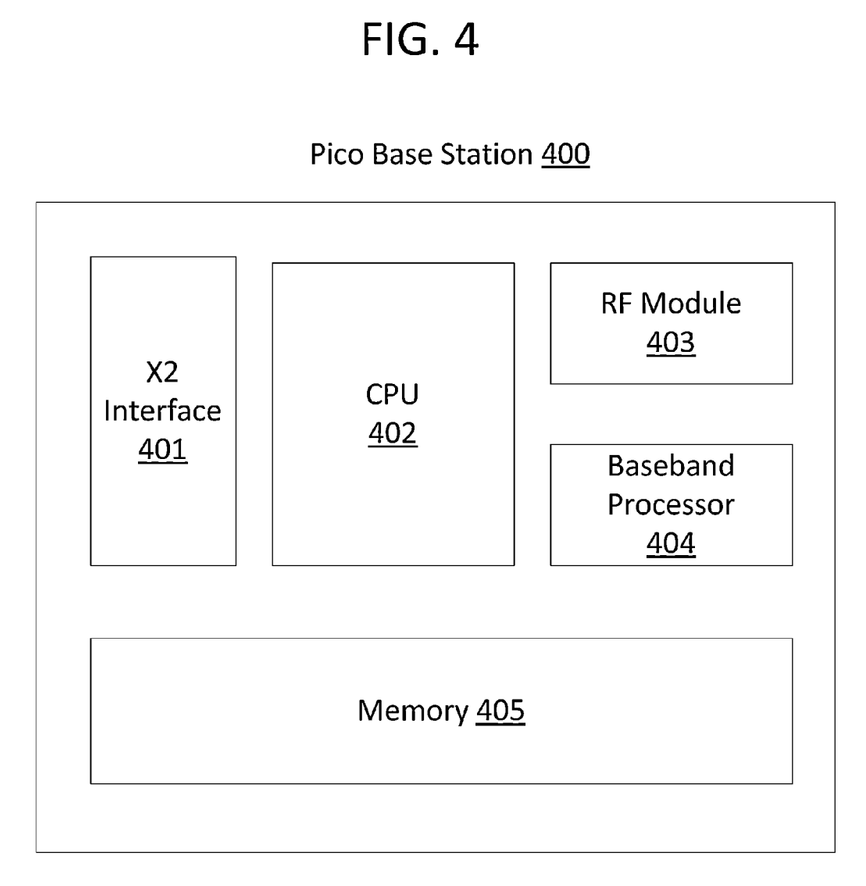
FIG. 4 illustrates a block diagram of a hardware configuration of a pico BS, in accordance with an example embodiment.

FIG. 4 illustrates a block diagram of a hardware configuration of a pico BS, in accordance with an example embodiment. The hardware configuration as depicted in the block diagram may be implemented in any pico BS (e.g., such as pico BS1 200-1 and pico BS2 200-2 as depicted in FIG. 2). The pico BS may use a configuration 400 including an X2 interface 401, a central processing unit (CPU) 402, a radio frequency (RF) module 403, a baseband processor 404 and a memory 405. The CPU 402 is configured to estimate the interference level for each PRB based on the received power allocation pattern(s) from one or more macro BSs and to update the interference distribution table in the memory 405. Further, the CPU 402 is configured to schedule the pico UEs based on the interference distribution table in the memory 405. The CPU 402 also controls the baseband processor 404 and the RF module 403 to transmit data for the scheduled UEs.

The baseband processor 404 is configured to handle baseband operations for the pico BS. The baseband operations for the pico BS are similar to those for the macro BS.

The RF module 403 is configured to handle RF operations for the pico BS. The RF operations for the pico BS are similar to those for the macro BS.

The memory 405 is configured to store the interference distribution table, details of which are provided below in the description for Table III.

The X2 interference 401 is configured to handle information exchange with its neighboring pico BSs. Specifically, the pico BS sends its traffic load information via X2 interface to its neighboring macro BSs such that they can determine their power allocation patterns, as described in further detail in the description for FIG. 7. After receiving the power allocation pattern from its neighboring macro BSs, the pico BS estimates the interference distribution and adjusts its scheduler accordingly, as described in further detail in the description for FIG. 10.

Figure 5:
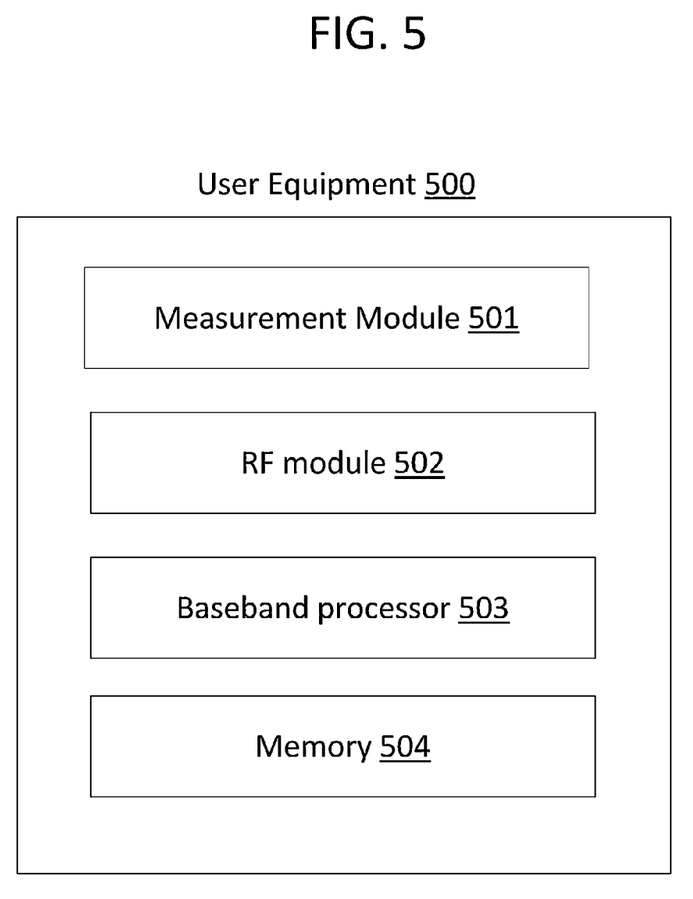
FIG. 5 illustrates a block diagram of a hardware configuration of a UE in a LTE-A system.

FIG. 5 illustrates a block diagram of a hardware configuration of a UE in an LTE-A system. The hardware configuration as depicted in the block diagram may be implemented in any UE (e.g., UEs 202-1, 202-2, 202-3, 202-4, 202-5 as depicted in FIG. 2) in a LTE-A system. The UE may use a configuration 500 including a measurement module 501, a radio frequency (RF) module 502, a baseband processor 503 and a memory 504. The measurement module 501 is configured to measures the reference signal received power (RSRP) from its neighboring macro and pico BSs and to send the measurement result to the associated BSs. The baseband processor 503 is configured to handle baseband operations for the UE. The RF module 502 is configured to handle RF operations for the UE. The memory 504 stores received data packets.

Figure 6:
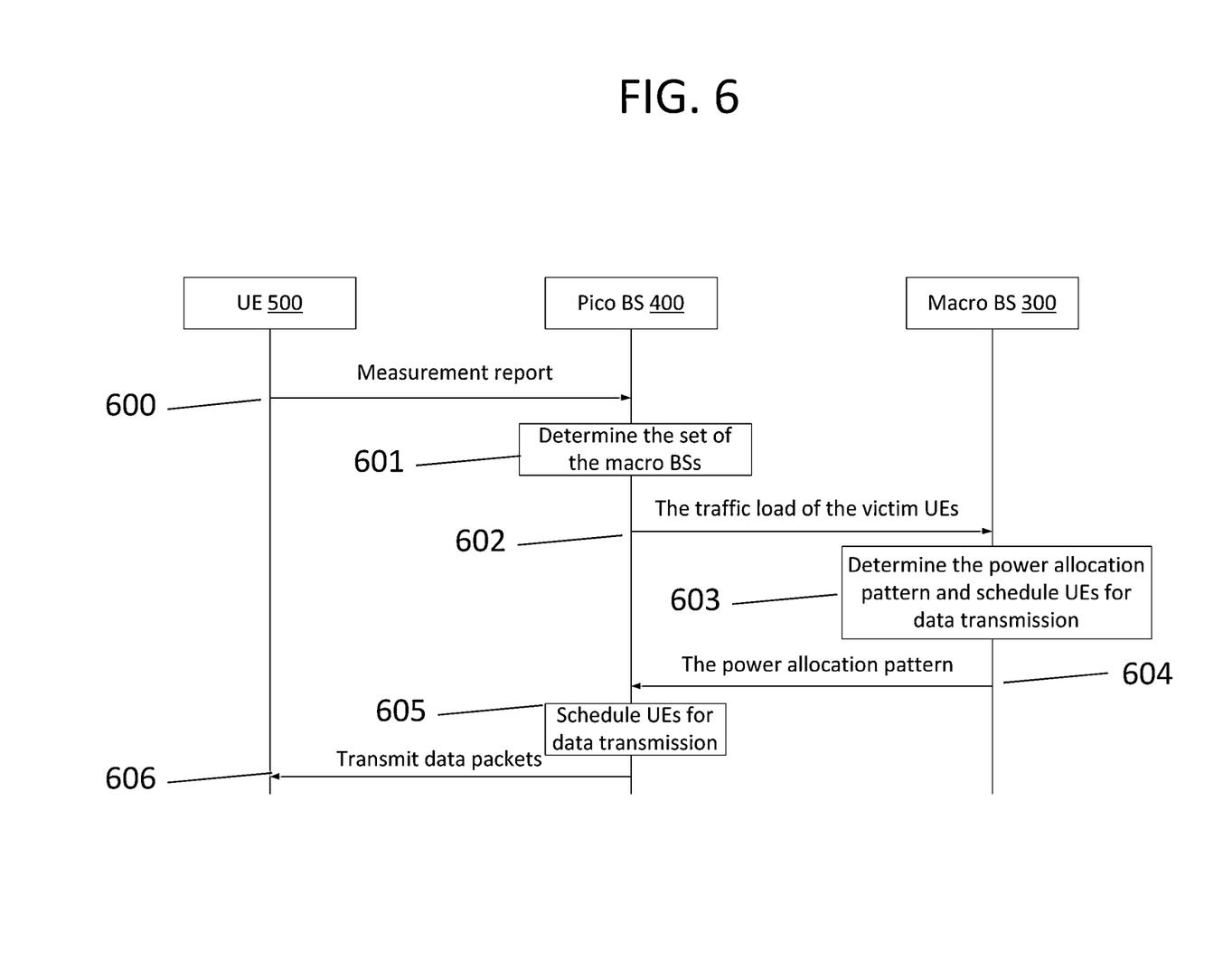
FIG. 6 illustrates a flow diagram of a system in accordance with an example embodiment.

FIG. 6 illustrates a flow diagram of a system in accordance with an example embodiment. At 600, each UE measures the RSRPs from its neighboring BSs and sends the measurement report to its associated BS. At 601, after receiving the measurement reports from its associated UEs, each pico BS identifies the victim UEs for each macro BS in the neighborhood, and determines a set of the macro BSs, to which at 602 the pico BS reports the traffic load of their victim UEs. At 603, the pico BS sends the traffic load information to each macro BS within the reporting set through an X2 interface. The traffic load information for the victim UEs may include the number of PRBs assigned to the victim UEs, the packet arrival rate, or the throughput. At 604, based on the traffic load reports from one or more pico BSs, a macro BS determines the power allocation pattern. At 604, the macro BS shares the pattern with one or more pico BSs (via an X2 interface) for the UE scheduling. Meanwhile, the macro BS may schedules its own UEs for data transmission based on its power allocation pattern. At 605, the pico BSs generate a data transmission schedule for the associated UEs based on the received power allocation pattern. At 606, the pico BSs instruct the associated UEs to transmit data packets based on the data transmission schedule.

Figure 7:
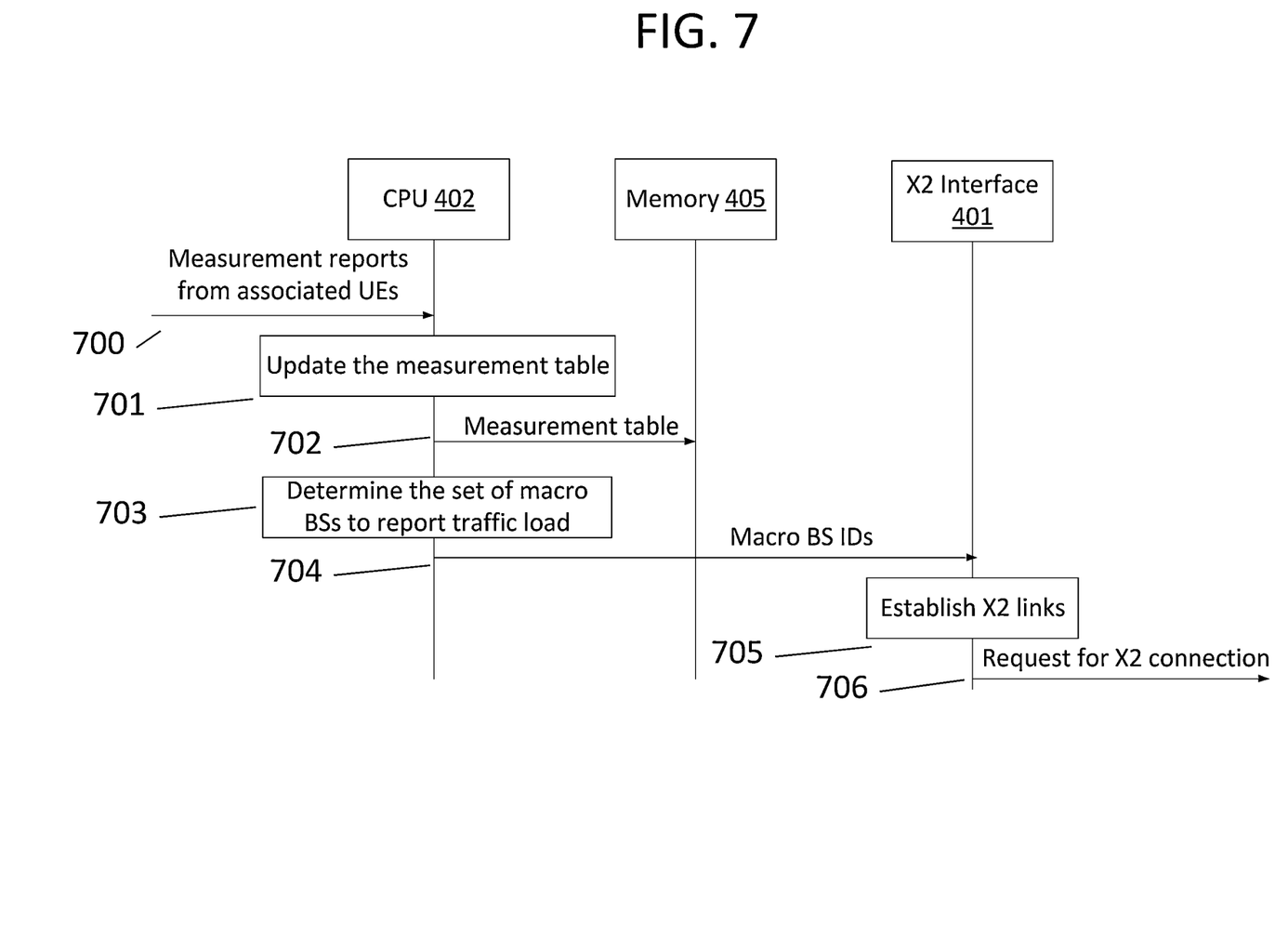
FIG. 7 illustrates a flow diagram for a pico BS to report its traffic load information to its neighboring macro BSs, in accordance with an example embodiment.

FIG. 7 illustrates a flow diagram for a pico BS to report its traffic load information to its neighboring macro BSs, in accordance with an example embodiment. The pico BS receives the measurement reports from its associated UEs. References are made with respect to the example hardware configuration 400 of FIG. 4. At 700, the CPU receives measurement reports from the associated UEs. Based on the received measurement reports, the CPU updates the RSRP measurement table in the memory 405 as shown at 701 and 702.

Based on the measurement table and the threshold for the victim UE, the CPU 402 can identify the victim UEs for a particular macro BS. If the number of victim UEs for a macro BS is above a threshold, the CPU 402 may include the macro BS into the reporting set to report traffic load at 703. At 704, the IDs of the macro BSs in the reporting set are sent to the X2 interface 401 to establish connections with those macro BSs. The X2 interface 401 establishes links to the macro BSs in the reporting set at 705, and requests X2 connections at 706. Once the connection to a macro BS is established, the pico BS will send the traffic load report, which provides the overall traffic load for the victim UEs of this macro BS. For example, pico BS1 200-1 in FIG. 2 will report the sum traffic load of UE1 202-1 and UE2 202-2 to macro BS1 201-1.

Table I, as shown below, is an example RSRP measurement table for a pico BS (in this example, pico BS1 200-1 as depicted in FIG. 2), where the example RSRP values are given for illustration purposes and the example threshold for the victim UE is set to be 10.

TABLE I

Example RSRP measurement table

| UE ID | Cell ID | RSRP | Victim UE (Yes/No) |
|---|---|---|---|
| UE1 | Macro BS1 | 15 | Yes |
|  | Macro BS2 | 14 | Yes |
| UE2 | Macro BS1 | 17 | Yes |
|  | Macro BS2 | 6 | No |

Figure 8:
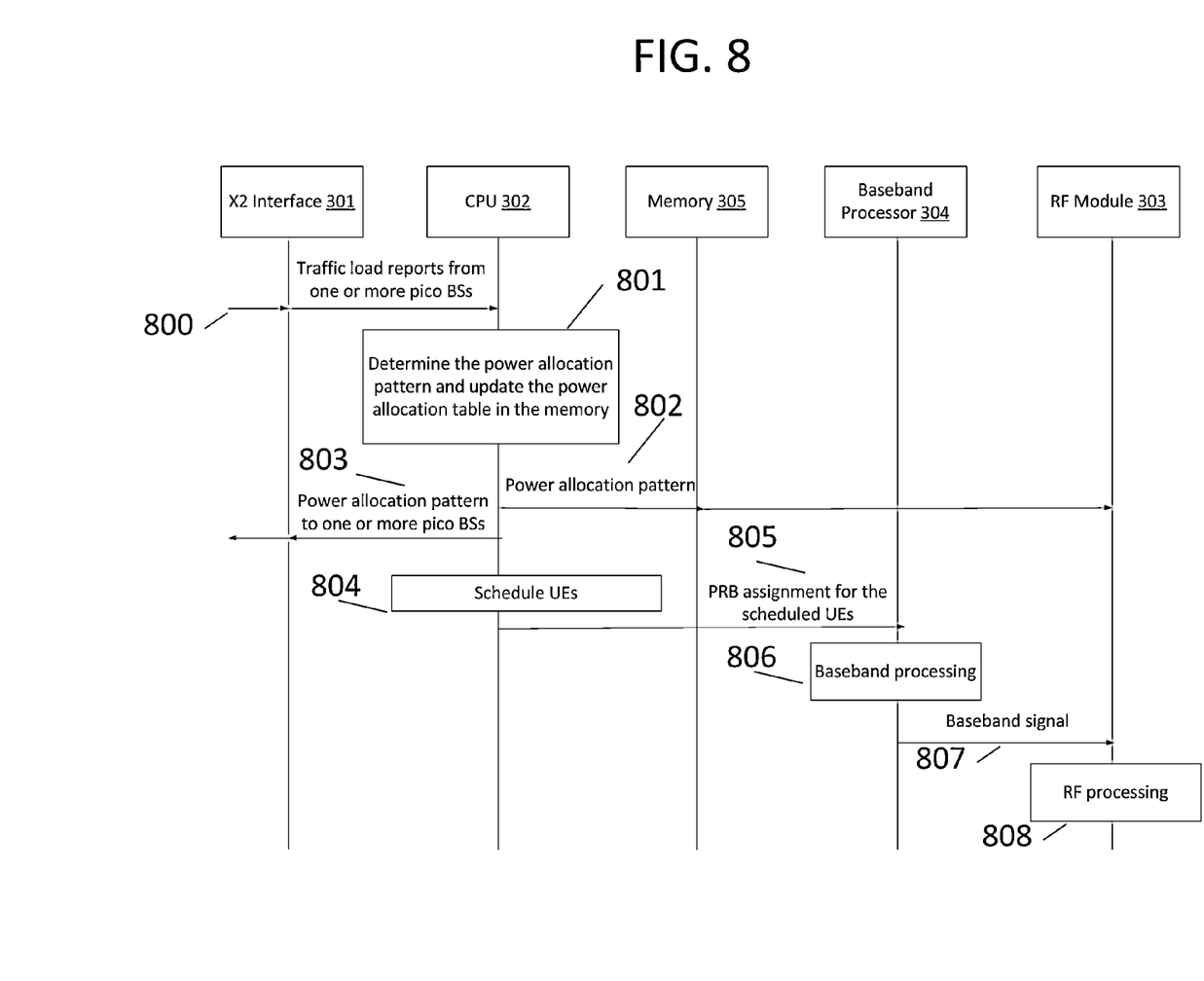
FIG. 8 illustrates a flow diagram for a macro BS, in accordance with an example embodiment.

FIG. 8 illustrates a flow diagram for a macro BS, in accordance with an example embodiment. At 800, the macro BS receives the traffic load information from one or more pico BSs via an X2 interface 301. Based on the traffic load reports, the CPU 302 determines the power allocation pattern and updates the power allocation table in the memory 305 accordingly, as shown at 801 and 802. Furthermore, the CPU sends the power allocation pattern to the RF module such that the output signal of the RF module follows the pattern. The power allocation pattern may also be sent to one or more pico BSs as shown at 803. Based on the power allocation pattern, the CPU 302 schedules the UEs associated with the macro BS, as shown at 804. The PRB indices assigned to each scheduled UE are then sent to the baseband processor 304 for baseband processing as shown at 805 and 806, respectively. Afterwards, the baseband signal is sent to the RF module 303 for RF processing, as shown at 807 and 808, respectively.

In the aforementioned examples, the transmit powers for the REs within the same PRB is set to be the same. However, the transmit powers for different PRBs may also be different. FIGS. 9(a) to 9(d) illustrate examples of the power allocation pattern in time and frequency domain, in accordance with an exemplary embodiment. The examples of FIGS. 9(a) to 9(d) are for a LTE-A frame, with ten subframes and 1.4 MHz bandwidth, and indicate the transmit power for a given PRB and subframe. The columns of the examples indicate the subframe index, or the corresponding subframe in the time domain. The rows of the examples indicate the PRB index, or the transmit power of a corresponding PRB. The power allocation pattern has various structures.

The transmit power for each PRB can be configured with three values: a first transmit power that is used as a default setting, a second transmit power that is less than the first transmit power (e.g., a certain percentage of the first transmit power), and zero or no transmit power.

For example, if one PRB is configured with the first transmit power, the PRBs within the same subframe may be configured with the first transmit power.

If one PRB is configured with the second transmit power, the PRBs within the same row (except for the PRBs with the first transmit power configuration) may be configured with the second transmit power.

If one PRB is configured with no transmit power, the PRBs within the same row (except for the PRBs with first transmit power configured) may be configured with no transmit power.

Multiple power allocation patterns may be predefined and stored in a table in the memory. Table II (below) illustrates an example of such a table based on the four power allocation patterns as shown in FIGS. 9(a) to 9(d), where two bit maps are used to describe the power allocation pattern. In the table below, the power allocation pattern index 1, 2, 3, and 4 correspond to FIGS. 9(a), 9(b), 9(c), and 9(d), respectively.

Figure 9A:
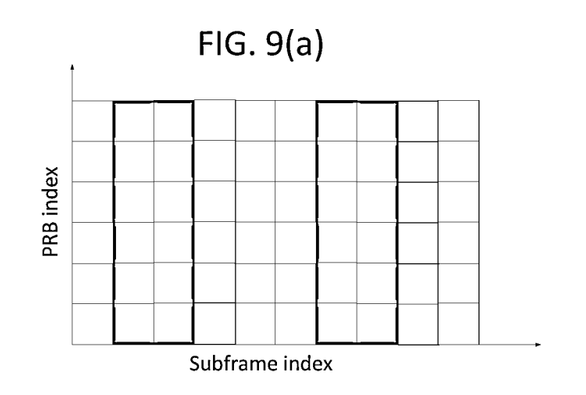
FIGS. 9(a) to 9(d) illustrate examples of the power allocation pattern, in accordance with an exemplary embodiment.
Figure 9B:
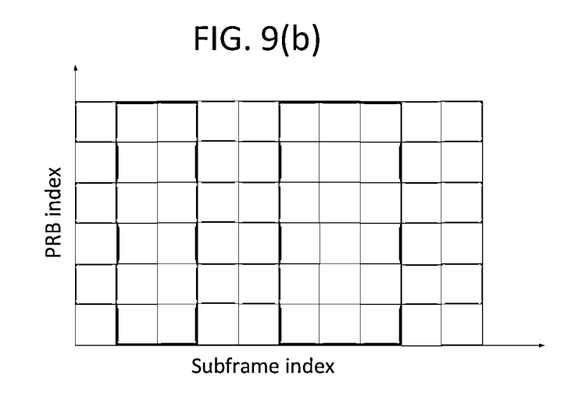
Figure 9C:
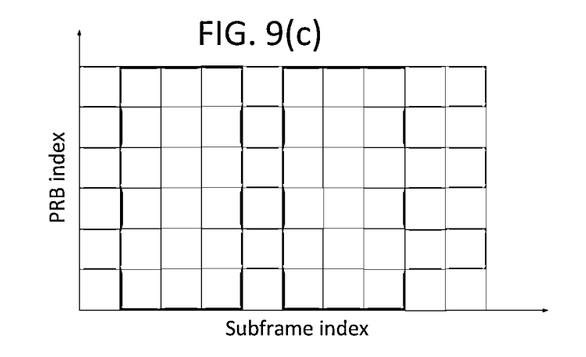
Figure 9D:
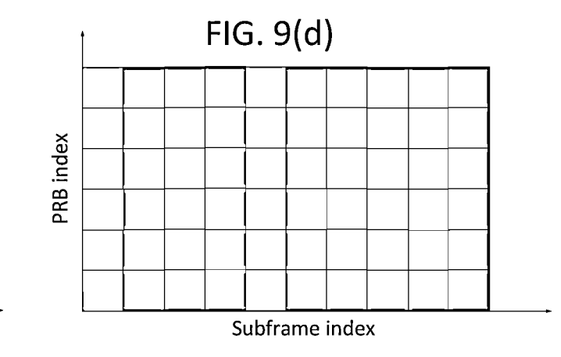

Specifically, the first bit map has ten bits which indicate the locations (subframe) of the PRBs configured with first transmit power, and the send bit map indicates the locations (frequency bands) of the PRBs configured with second transmit power. Depending on the total bandwidth, the length of the second bit map may vary. For example, The two bit maps for FIG. 9(b) are given as follows.

First bit map: 0 1 1 0 0 1 1 1 0 0, where "1" denotes that the PRBs in the corresponding subframes (columns) are configured with the first transmit power.

Second bit map: 0 1 0 1 0 1, where "1" denotes that the PRBs in the corresponding frequency band (rows) are configured with the second transmit power.

A unique muting ratio is associated with each power allocation pattern, which is defined as $p_z+(1-\alpha)p_r$, where $p_r$ and $p_z$ are the percentages of the PRBs with the second transmit power and no transmit power, respectively and $\alpha$ is the ratio between the value of the second transmit power and that of the first transmit power.

TABLE II

Example power allocation table

| Power allocation pattern index | First bit map | Second bit map | α | Muting ratio | Active |
|---|---|---|---|---|---|
| 1 | 0 1 1 0 0 0 1 1 0 0 | 0 0 0 0 0 0 | 0 | 60% | No |
| 2 | 0 1 1 0 0 1 1 1 0 0 | 0 1 0 1 0 1 | 25% | 44% | Yes |
| 3 | 0 1 1 1 0 1 1 1 0 0 | 0 1 0 1 0 1 | 50% | 30% | No |
| 4 | 0 1 1 1 0 1 1 1 1 1 | 1 1 1 1 1 1 | 50% | 10% | No |

Next, the power allocation pattern is chosen from the power allocation table based on the received traffic load information from one or more pico BSs. Assuming that the macro BS receives the traffic load reports from M pico BSs and the traffic load of pico $BS_m$ is $T_m$, the CPU of the macro BS calculates the following metric $$\frac{\frac{1}{M}\sum_{m=1}^{M} \beta_m T_m}{\frac{1}{M}\sum_{m=1}^{M} \beta_m T_m + T_0}$$

where $T_0$ is the traffic load of the macro BS, and $\beta_m$ is a system parameter for pico $BS_m$ with $$\sum_{m=1}^{M} \beta_m = 1.$$

The CPU of the macro BS then chooses the power allocation pattern whose muting ratio is closest to the above metric and updates the power allocation table by setting the field "Active" of the selected pattern to be "Yes" (the fields "Active" of the rest patterns are set to be "No" automatically) in the memory.

The CPU of the macro BS schedules its associated UEs for data transmission based on the selected power allocation pattern as follows. The UEs are divided into two groups based on their RSRPs: the cell-center UEs whose RSRPs are above a predefined threshold, and the cell-edge UEs whose RSRPs are below the predefined threshold. The CPU of the macro BS schedules the cell-center UEs only over the PRBs with second transmit power. For the PRBs with first transmit power, the CPU of the macro BS schedules the UEs from the two groups. The PRB indices assigned to each scheduled UE and the active power allocation pattern are passed to the baseband processor and the RF module such that the output signal from the RF module follows the selected power allocation pattern. The two bit maps and the value of the second transmit power for the selected power allocation pattern are sent to one or more pico BSs that have X2 connections with the macro BS.

Figure 10:
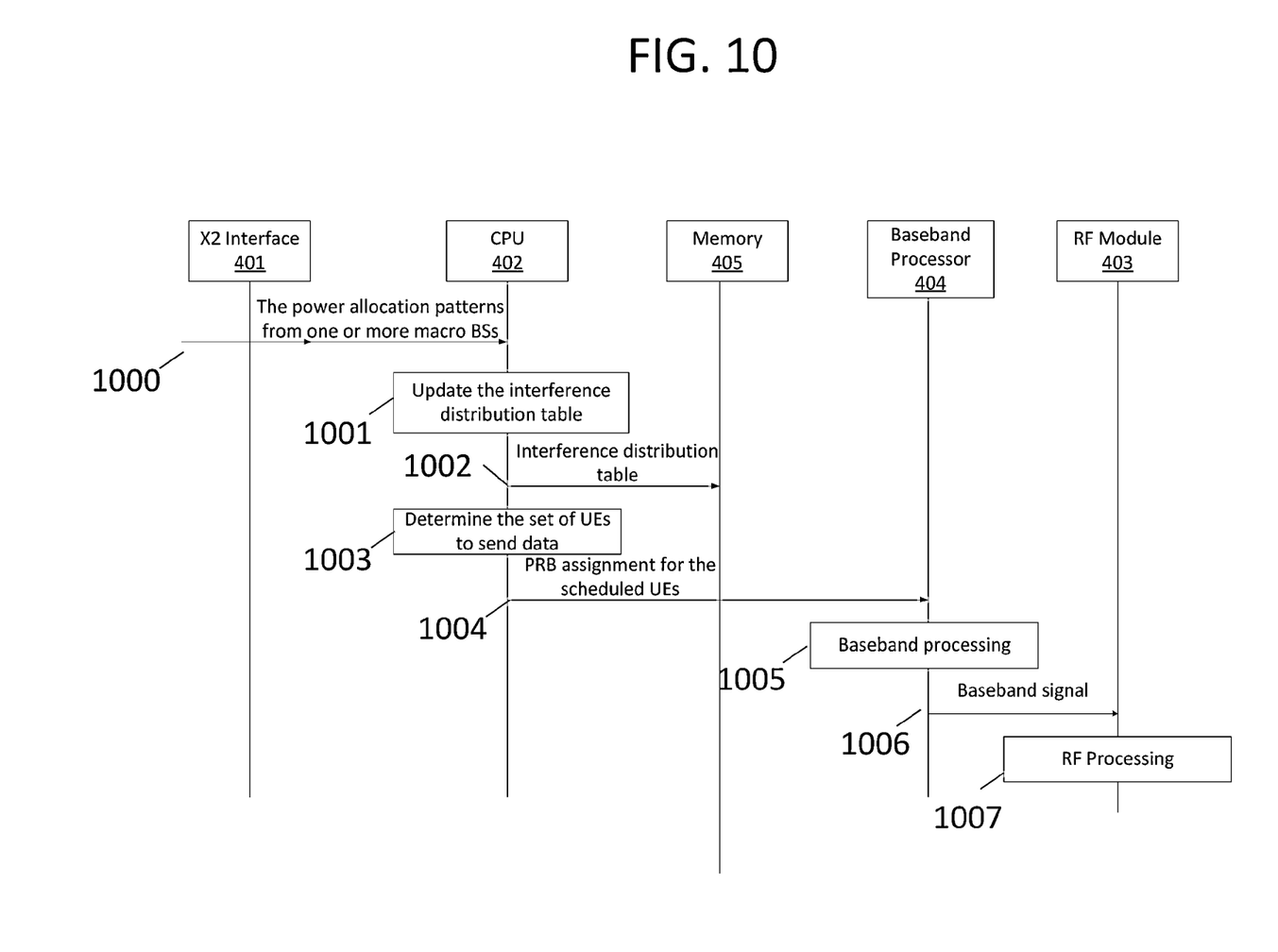
FIG. 10. illustrates a flowchart of the operations for a pico BS after receiving the power allocation pattern from its neighboring macro BSs, in accordance with an exemplary embodiment.

FIG. 10 illustrates a flowchart of the operations for a pico BS after receiving the power allocation pattern from its neighboring macro BSs, in accordance with an exemplary embodiment. The flowchart as illustrated in FIG. 10 is for receiving and processing the power allocation patterns from one or more macro BSs. The X2 interface 401 receives the power allocation patterns from one or more macro BSs and forwards them to the CPU 402, as shown at 1000. The CPU 402 updates the interference distribution table in the memory 405 based on the received power allocation patterns as shown at 1001 and 1002. An example of the interference distribution table is given in Table III (below), where "High" and "Low" denote the interference level for a state that includes a given PRB and a given subframe. The details of the updating the interference level for a particular state is as follows.

Case 1: When only one power allocation pattern is received, the interference level of the state is set to be "High" if the received power allocation pattern indicates that the state is configured with first transmit power or with a second transmit power above a certain threshold. Otherwise, the interference level is set to be "Low". For example, if the power allocation pattern as shown in FIG. 9(a) is received, the interference table should be updated as shown in Table III.

TABLE III

An example interference distribution table in Case 1

| | Subframe index | | | | | | | | | |
|---|---|---|---|---|---|---|---|---|---|---|
| PRB index | 1 | 2 | 3 | 4 | 5 | 6 | 7 | 8 | 9 | 10 |
| 1 | Low | High | High | Low | Low | Low | High | High | Low | Low |
| 2 | Low | High | High | Low | Low | Low | High | High | Low | Low |
| 3 | Low | High | High | Low | Low | Low | High | High | Low | Low |
| 4 | Low | High | High | Low | Low | Low | High | High | Low | Low |
| 5 | Low | High | High | Low | Low | Low | High | High | Low | Low |
| 6 | Low | High | High | Low | Low | Low | High | High | Low | Low |

Case 2: When more than one power allocation patterns from multiple macro BSs are received, the interference level of the PRB is set to be "High" if any of the received power allocation patterns indicate that the PRB is configured with first transmit power or with second transmit power above a certain threshold, then the interference level is set to be "High". Otherwise, the interference is set to be "Low". For example, if power allocation patterns as shown in FIGS. 9(a) and 9(b) are received and the value of the second transmit power in the pattern of FIG. 9(b) is above the predefined threshold, the interference table should be updated as shown in Table IV.

TABLE IV

An example interference distribution table in Case 2

| PRB index | Subframe index | | | | | | | | | |
|---|---|---|---|---|---|---|---|---|---|---|
| | 1 | 2 | 3 | 4 | 5 | 6 | 7 | 8 | 9 | 10 |
| 1 | Low | High | High | Low | Low | High | High | High | Low | Low |
| 2 | High | High | High | High | High | High | High | High | High | High |
| 3 | Low | High | High | Low | Low | High | High | High | Low | Low |
| 4 | High | High | High | High | High | High | High | High | High | High |
| 5 | Low | High | High | Low | Low | High | High | High | Low | Low |
| 6 | High | High | High | High | High | High | High | High | High | High |

At 1003, the CPU schedules UEs for data transmission based on the interference distribution table as follows. The UEs are divided into two groups based on their RSRPs: the cell-center UEs whose RSRPs are above a threshold (e.g., predefined), and the cell-edge UEs whose RSRPs are below the threshold. The CPU schedules the cell-edge UEs only over the PRBs with low interference level. For the PRBs with high interference level, the CPU schedules the UEs from the two groups. The PRB indices assigned to each scheduled UE are passed to baseband processor for the baseband processing as shown in 1004 and 1005. The baseband signal of the baseband processing is sent to the RF module 403 for RF processing, as shown at 1006 and 1007.

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example embodiments, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The example embodiments also relate to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of tangible media suitable for storing electronic information. The algorithms and displays presented herein are not inherently related to any particular computer or other apparatus.

Various general-purpose systems may be used with programs and modules in accordance with the teachings herein, or it may prove convenient to construct a more specialized apparatus to perform desired method steps. In addition, the example embodiments are not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out the example embodiments. Furthermore, some example embodiments may be performed solely in hardware, whereas other example embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the example embodiments will be apparent to those skilled in the art from consideration of the specification and practice of the example embodiments disclosed herein. Various aspects and/or components of the described example embodiments may be used singly or in any combination. It is intended that the specification and examples be considered as examples, with a true scope and spirit of the embodiments being indicated by the following claims.

What is claimed is:

1. A pico base station, comprising:
    a central processing unit (CPU) configured to:
        generate interference distribution information for user equipment (UE) scheduling based on at least one power allocation pattern of a plurality of physical resource blocks (PRBs) associated with at least one macro base station; and
        schedule at least one UE associated with the pico base station based on the interference distribution information.

2. The pico base station of claim 1, wherein the interference distribution information comprises a plurality of states indicative of one of a high interference state and a low interference state for each of the plurality of PRBs.

3. The pico base station of claim 2, wherein the CPU is further configured to determine a number of cell-edge UEs from the at least one UE associated with the pico base station for scheduling at a subframe having the low interference state, the number of the cell-edge UEs determined based on a reference signal received power (RSRP) from the pico base station.

4. The pico base station of claim 2, wherein the CPU is further configured to set ones of the plurality of states corresponding to ones of the plurality of PRBs to the high interference state if the transmit power of one of the plurality of PRBs from any received power allocation pattern corresponding to the ones of plurality of states is above a threshold, when more than one power allocation pattern is received indicating differing transmit powers for the respective ones of the plurality of PRBs.

5. The pico base station of claim 2, wherein the CPU is further configured to set ones of the plurality of states to the low interference state, if transmit powers of ones of the plurality of PRBs from all received power allocation patterns corresponding to the ones of the plurality of states are below a threshold transmit power, when more than one power allocation pattern is received indicating differing transmit powers for the respective ones of the plurality of PRBs.

6. The pico base station of claim 2, wherein the CPU is further configured to set ones of the plurality of states corresponding to ones of the plurality of PRBs having a non-zero transmit power above a threshold of the at least one power allocation pattern to the high interference state, if only one power allocation pattern is received.

7. The pico base station of claim 1, wherein the CPU is further configured to select ones of the at least one macro base station to receive a traffic load report of at least one victim UE associated with the pico base station, based on a RSRP of the at least one victim UE.

8. The pico base station of claim 7, wherein the CPU is further configured to transmit the traffic load report to the select ones of the at least one macro base station, if a number of the at least one victim UE exceeds a threshold.

9. A system, comprising:
  at least one pico base station configured to:
    generate interference distribution information for user equipment (UE) scheduling based on at least one power allocation pattern of a plurality of physical resource blocks (PRBs) associated with at least one macro base station; and
    schedule at least one UE associated with the at least one pico base station based on the interference distribution information;

and, the at least one macro base station configured to:
    determine the at least one power allocation pattern for the plurality of PRBs managed by the at least one macro base station, based on a traffic load of at least one victim UE; and
    transmit the power allocation pattern to the at least one pico base station associated with the at least one victim UE.

10. The system of claim 9, wherein the interference distribution information comprises a plurality of states indicative of one of a high interference state and a low interference state for each of the plurality of PRBs.

11. The system of claim 10, wherein the at least one pico base station is further configured to determine a number of cell-edge UEs from the at least one UE associated with the at least one pico base station for scheduling at a subframe having the low interference state, the number of the cell-edge UEs determined based on a reference signal received power (RSRP) from the at least one pico base station.

12. The system of claim 10, wherein the at least one pico base station is further configured to set ones of the plurality of states corresponding to ones of the plurality of PRBs to the high interference state if more than one power allocation pattern is received indicating differing transmit powers for the respective ones of the plurality of PRBs and the transmit power of one of the plurality of PRBs from any received power allocation pattern corresponding to the ones of plurality of states is above a threshold.

13. The system of claim 9, wherein the at least one macro base station is further configured to adjust transmit power of each of the plurality of PRBs to one of a first transmit power, a second transmit power that is less than the first transmit power, and no transmit power.

14. The system of claim 13, wherein the at least one macro base station is further configured to receive a configuration of the second transmit power as a percentage of the first transmit power.

15. The system of claim 13, wherein the at least one power allocation pattern comprises:
  a first map comprising information representative of ones of the plurality of PRBs configured with the first transmit power for a corresponding subframe; and
  a second map comprising information representative of ones of the plurality of PRBs configured with the second transmit power for a corresponding frequency band.

* * * * *